(12) United States Patent
Raloff

(10) Patent No.: US 10,603,738 B2
(45) Date of Patent: Mar. 31, 2020

(54) CABLE FOR ARC WELDER

(71) Applicant: Electron Beam Technologies, Inc., Kankakee, IL (US)

(72) Inventor: Valgene E. Raloff, Kankakee, IL (US)

(73) Assignee: Electron Beam Technologies, Inc., Kankakee, IL (US)

( * ) Notice: Subject to any disclaimer, the term of this patent is extended or adjusted under 35 U.S.C. 154(b) by 310 days.

(21) Appl. No.: 15/811,989

(22) Filed: Nov. 14, 2017

(65) Prior Publication Data

US 2018/0133829 A1 May 17, 2018

Related U.S. Application Data

(60) Provisional application No. 62/421,721, filed on Nov. 14, 2016.

(51) Int. Cl.
*B23K 9/32* (2006.01)
*B23K 9/173* (2006.01)

(52) U.S. Cl.
CPC .............. *B23K 9/323* (2013.01); *B23K 9/173* (2013.01)

(58) Field of Classification Search
CPC ................................ B23K 9/323; B23K 9/173
USPC ........................................................ 219/137.9
See application file for complete search history.

(56) References Cited

U.S. PATENT DOCUMENTS

| | | | |
|---|---|---|---|
| 4,206,862 A * | 6/1980 | DaCosta | B23K 9/1336 219/137.2 |
| 5,248,868 A | 9/1993 | Cusick, III | |
| 5,585,021 A | 12/1996 | Sperling et al. | |
| 5,874,709 A * | 2/1999 | New | B23K 9/32 219/137.9 |
| 7,274,001 B1 | 9/2007 | Cusick, III | |
| 7,442,898 B2 | 10/2008 | Di Novo et al. | |
| 8,212,182 B2 | 7/2012 | Mormino, Jr. | |
| 2004/0144764 A1* | 7/2004 | Inoue | B23K 9/1336 219/137.9 |
| 2005/0211686 A1* | 9/2005 | Inoue | B23K 9/287 219/137.9 |
| 2007/0051715 A1* | 3/2007 | Rehrig | B23K 9/323 219/137.9 |
| 2008/0011730 A1* | 1/2008 | Enyedy | B23K 9/323 219/137.9 |

(Continued)

*Primary Examiner* — Huyen D Le

(74) *Attorney, Agent, or Firm* — Leydig, Voit & Mayer, Ltd.

(57) ABSTRACT

An arc welder cable includes a resiliently flexible hose, an intermediate sheath, a plurality of conductors, and an outer sheath. The hose defines an axial passageway configured to permit passage of a welding wire and a shielding gas therethrough. The intermediate sheath circumscribes the hose such that the hose is disposed radially within the intermediate sheath. The intermediate sheath is made from an electrically-insulative material and is in sealing contact with an outer surface of the hose. The conductors are disposed circumferentially about the intermediate sheath and disposed radially outward of the intermediate sheath. The conductors extend along the intermediate sheath in a helical manner. The conductors are made from an electrically-conductive material. The outer sheath is made from an electrically-insulative material and circumscribes the conductors such that the conductors, the intermediate sheath, and the hose are disposed radially within the outer sheath.

20 Claims, 3 Drawing Sheets

(56) References Cited

U.S. PATENT DOCUMENTS

2015/0273613 A1* 10/2015 Cooper .................. B23K 9/122
219/137.9

* cited by examiner

# CABLE FOR ARC WELDER

CROSS-REFERENCE TO RELATED APPLICATION

This patent application claims the benefit of priority to U.S. Patent Application No. 62/421,721, filed Nov. 14, 2016, and entitled "Cable for Arc Welder," which application is incorporated in its entirety herein by this reference.

TECHNICAL FIELD

This patent disclosure relates generally to a cable for an arc welder and, more particularly, to a cable for an arc welder in which the cable is configured to supply a welding current, a welding wire, and an inert gas to a welding torch.

BACKGROUND

Welding is a well-known process that is used to join parts together for a variety of intended applications. One such welding technique is referred to as arc welding.

Arc welding is a welding technique that joins separate metal parts together using a fusion process. Intense heat is applied to metal at a joint interface between two parts, causing the metal to melt and intermix, either directly between the parts or more typically with an intermediate molten filler metal. Upon cooling and solidification, a metallurgical bond is formed between the two parts.

In arc welding, an electric arc produces the intense heat necessary to melt metal. The arc is formed between the workpiece and an electrode, typically in the form of a wire that is manually or automatedly guided along a weld path over the joint interface. The electrode can be in the form of a wire that not only conducts the current but also melts and supplies filler metal to the joint, also referred to as a consumable electrode.

In a conventional arc welding system, an arc welder cable conveys inert gas and an electrical current from suitable gas and power sources, respectively, to a welding torch. A welding wire, or electrode, can also be fed through the arc welder cable to the welding torch.

There are many challenges in designing an arc welder cable. In particular, when used in a robotic welding system, the welding cable must endure repeated bending and continuous operation. Robotic welding systems can include a robotic assembly that can manipulate the welding torch at a high rate of speed over a defined movement path that is repeated for each welding operation, which can make the arc welder cable more susceptible to earlier fatigue breakages. In addition, the welding cable is subjected to stretching, compressing, and bending actions performed by the robotic assembly that a human operator would not be physically capable of doing.

It will be appreciated that this background description has been created by the inventor to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

The present disclosure, in one aspect, is directed to embodiments of an arc welder cable. In one embodiment, the arc welder cable is for supplying a welding current, a welding wire and a supply of shielding gas to a welding torch. The arc welder cable includes a hose, an intermediate sheath, a plurality of conductors, and an outer sheath.

The hose is resiliently flexible and has an inner surface and an outer surface. The inner surface defines an axial passageway configured to permit passage of the welding wire and the shielding gas therethrough.

The intermediate sheath circumscribes the hose such that the hose is disposed radially within the intermediate sheath. The intermediate sheath is in sealing contact with the outer surface of the hose. The intermediate sheath is made from an electrically-insulative material.

The plurality of conductors is disposed circumferentially about the intermediate sheath and is disposed radially outward of the intermediate sheath. The plurality of conductors each extends along the intermediate sheath in a helical manner. The plurality of conductors each is made from an electrically-conductive material.

The outer sheath circumscribes the plurality of conductors such that the plurality of conductors, the intermediate sheath, and the hose are disposed radially within the outer sheath. The outer sheath is made from an electrically-insulative material.

In another aspect of the present disclosure, an arc welding system includes an arc welder cable according to the present disclosure. Further and alternative aspects and features of the disclosed principles will be appreciated from the following detailed description and the accompanying drawings. As will be appreciated, the arc welder cables and arc welding systems disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
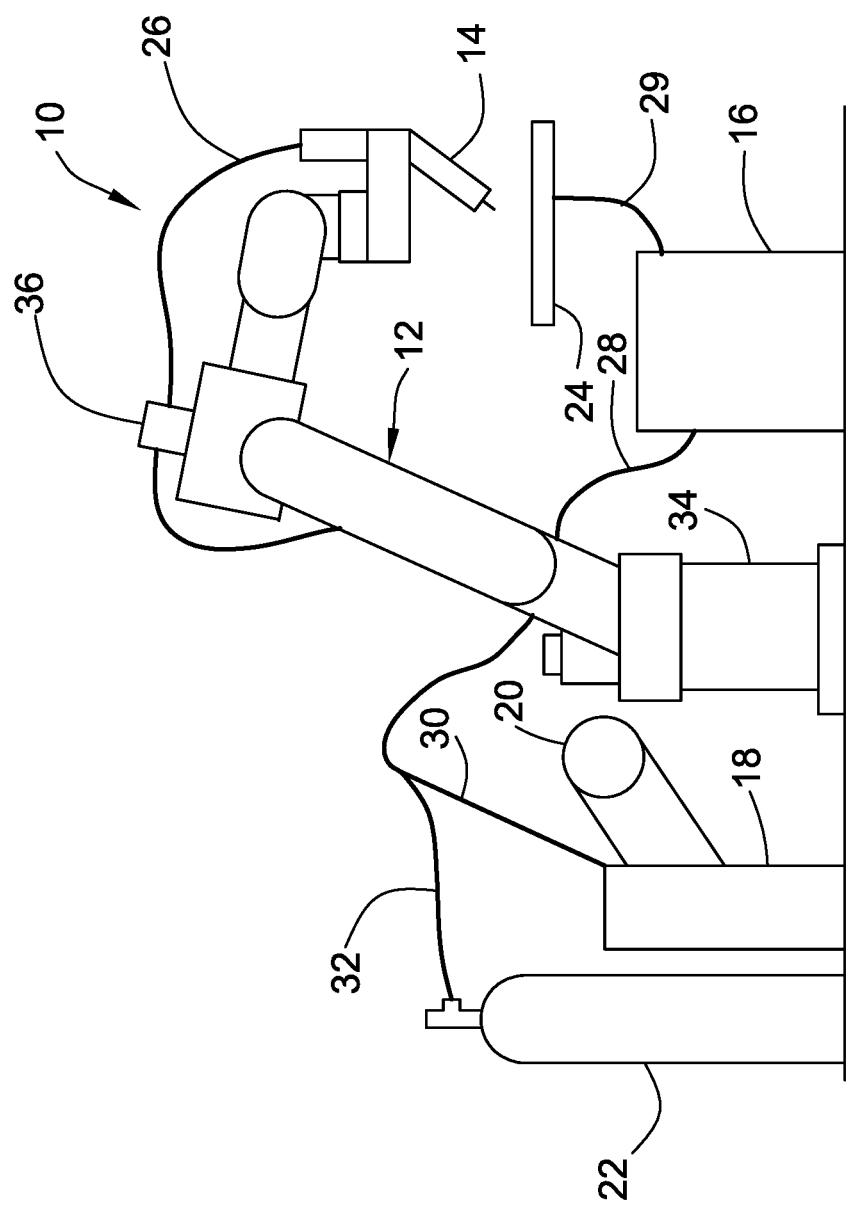
FIG. 1 is a diagram of an embodiment of a welding system including an arc welder cable constructed according to principles of the present disclosure.

FIG. 1 illustrates an embodiment of an arc welding system in the form of a robotic welding system 10 that includes an arc welder cable 26 constructed according to principles of the present disclosure. The exemplary robotic welding system 10 shown in FIG. 1 includes an arc welding robot assembly 12, a power source 16, a wire feed unit 18, and a supply of shielding gas 22. It will be understood that the illustrated system 10 is one example of an arc welding system that can be constructed according to principles of the present disclosure and that embodiments of an arc welder cable constructed according to principles of the present disclosure can be used in any suitable arc welding system.

In embodiments, the robot assembly 12 can be of any suitable configuration and construction for welding a work piece 24. The robot assembly 12 can be, for example, a multi-jointed robot, such as, for example, one with six-axes of movement as shown.

The robot assembly 12 includes a welding torch 14, which is positionable by the welding robot 12 to weld a workpiece 24. In embodiments, the welding torch 14 can be any suitable welding torch known to those skilled in the art and can be configured to be coupled with the arc welder cable 26. The arc welder cable 26 is coupled to the welding torch 14.

The power source 16 can be adapted to provide the electrical power for the arc-welding circuit. The power source 16 includes an electrode electrical cable 28 and a work piece electrical cable 29 that can be respectively electrically connected to the welding wire (also referred to as an electrode) and the work piece 24. In embodiments, the power source 16 can be any suitable arc welding power source suitable for producing an arc-welding circuit sufficient for the intended purpose of producing an arc weld.

In embodiments, the wire feed unit 18 of the robotic welding system 10 is adapted to feed the electrode from an electrode source 20 to the welding torch 14 via an electrode feed line 30 and the arc welder cable 26. In embodiments, any suitable wire feed unit 18 can be used, as will be appreciated by one skilled in the art.

The shielding gas is conveyed from the gas supply 22 to the welding torch 14 through a gas supply line 32 and the arc welder cable 26. In embodiments, the shielding gas can be any suitable shielding gas, such as, an inert gas, for example, that can be used to helps shield the welding site from contaminants in the air. In embodiments, the shield gas comprises at least one of carbon dioxide, argon, or another suitable gas that can help protect the welding site from atmospheric gases, such as nitrogen and oxygen, which can cause fusion defects and unwanted porosity if they contact the electrode, the arc, or the welding metal.

In embodiments, the electrode electrical cable 28, the electrode feed line 30 and the gas supply line 32 can all connect to the arc welding robot 12 at any suitable point or points. In one embodiment, the lines 28, 30, and 32 attach to or enter the arc welding robot 12, for example, at or adjacent a base 34 thereof, or in the alternative, a fixed junction box 36 or the like attached to the arc welding robot 12. The electrical cable 28, the wire feed line 30 and the gas supply line 32 can arrive separately or in an interconnected configuration at the arc welding robot 12 as is readily understood by one skilled in the art.

The electrode electrical cable 28, wire feed line 30 and gas supply line 32 are combined with and/or are placed into communication with an integrated arc welder cable 26, which is attached to the welding torch 14 and adapted to deliver electrical current, welding wire, and the inert gas to the welding site on the workpiece 24. The electricity from the electrical cable 28 is carried by the arc welder cable 26 to the welding torch 14. The wire/electrode from the wire feed unit 18 enters and is conducted through the arc welder cable 26 to the welding torch 14. The gas from gas source 22 and supply line 32 is conducted through the arc welder cable 26 to the welding torch 14.

In one embodiment, the arc welder cable 26 extends from the junction box 36 to the welding torch 14. In embodiments, the arc welder cable 26 can include a suitable connector at each end thereof. A supply-side connector can be adapted to be used to connect the arc welder cable 26 to the electrical cable 28, the wire feed line 30 and the gas supply line 32. The torch-side connector can be configured to connect the arc welder cable 26 to the welding torch 14 via any suitable manner known to those skilled in the art. In embodiments, the supply-side connector and the torch-side connector can have any suitable construction, as one skilled in the art will appreciate, including using electrical connector blocks and terminals and pneumatic fittings, for example.

In operation, the arc welding robot 12 moves the welding torch 14 along the workpiece 24 to place one or more welds at selected position(s) of the workpiece. The motion of the welding torch 14 can cause the welding cable 26 to be twisted about its longitudinal axis, bent and changed in length by stretching or compressing. In embodiments, the welding cable 26 of the disclosure is constructed to exhibit long operational life in view of these challenging conditions.

Figure 3:
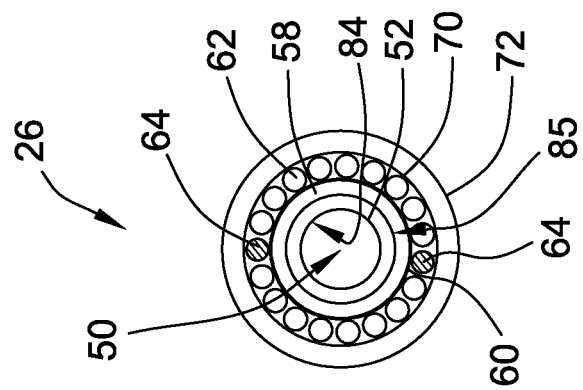
FIG. 3 is a transverse cross-sectional view of the arc welder cable of FIG. 2.
Figure 2:
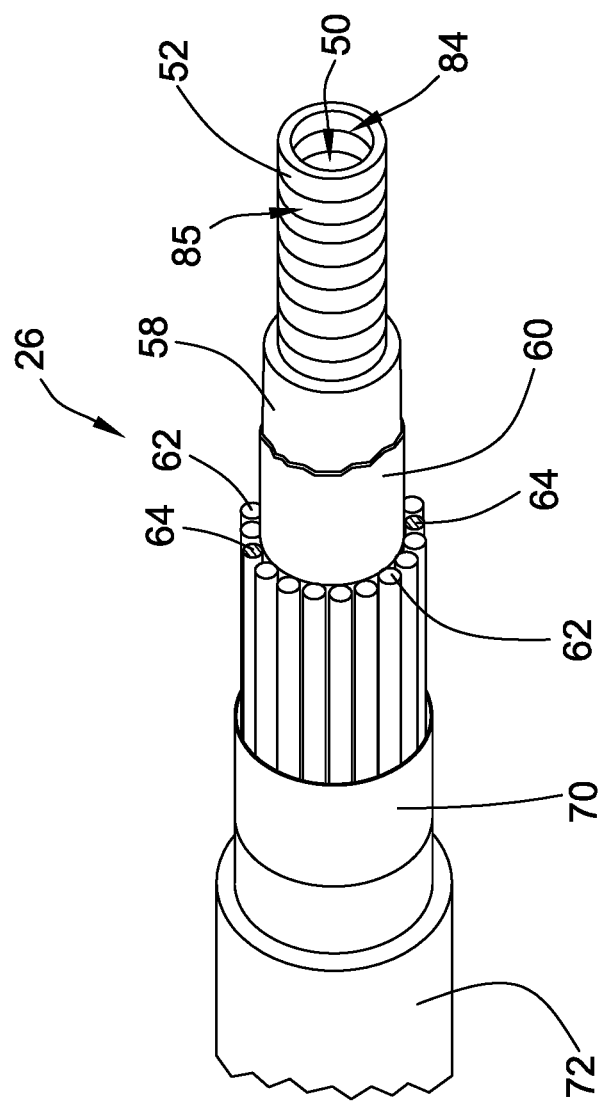
FIG. 2 is a fragmentary, cutaway perspective view of an embodiment of an arc welder cable constructed according to principles of the present disclosure.

Turning to FIGS. 2 and 3, the arc welder cable 26 includes a plurality of generally concentrically arranged components that are configured to conduct electricity and to convey shielding gas and the welding wire to the welding torch 14. The illustrated arc welder cable includes a hose 52, an intermediate sheath 58, an inner wrap 60, a plurality of conductors 62, a pair of insulated leads 64, an outer wrap 70, and, and an outer sheath 72. The arc welder cable 26 has an axial passageway 50 defined by the hose 52, which is centrally located radially within the arc welder cable 26 in the illustrated embodiment.

In embodiments, the hose 52 is resiliently flexible and has an inner surface 84 and an outer surface 85. The inner surface 84 defines the axial passageway 50. In embodiments, the passageway 50 is configured to permit passage of the welding wire and the shielding gas therethrough. In one embodiment, the passageway 50 is generally cylindrical. The passageway 50 can also assume an arcuate configuration when the arc welder cable 26 is urged into a curved shape. In embodiments, the hose 52 is configured to permit no more than a selected amount of bending and a selected amount of stretch.

In embodiments, the hose 52 can be made from any suitable material. For example, in one embodiment, the hose 52 can be made from a suitable metal, such as, galvanized steel, for example. In other embodiments, the hose 52 can be made from any other suitable material, such as a suitable metal, plastic, or other material that can provide adequate bending resistance and/or stretch resistance for the intended application of the arc welder cable 26.

In embodiments, the hose 52 comprises an interlocked monocoil. In embodiments, the hose 52 can have an interlocked monocoil construction that exhibits one or more of the following characteristics: stretch resistance, crush resistance, bending resistance greater than a specified bend radius of the arc welder cable 26, torsion resistance, and heat and corrosion resistance. In embodiments, the hose 52 can have a square lock configuration constructed of a continuously-interlocked, hot-dipped zinc galvanized steel core.

Figure 4:
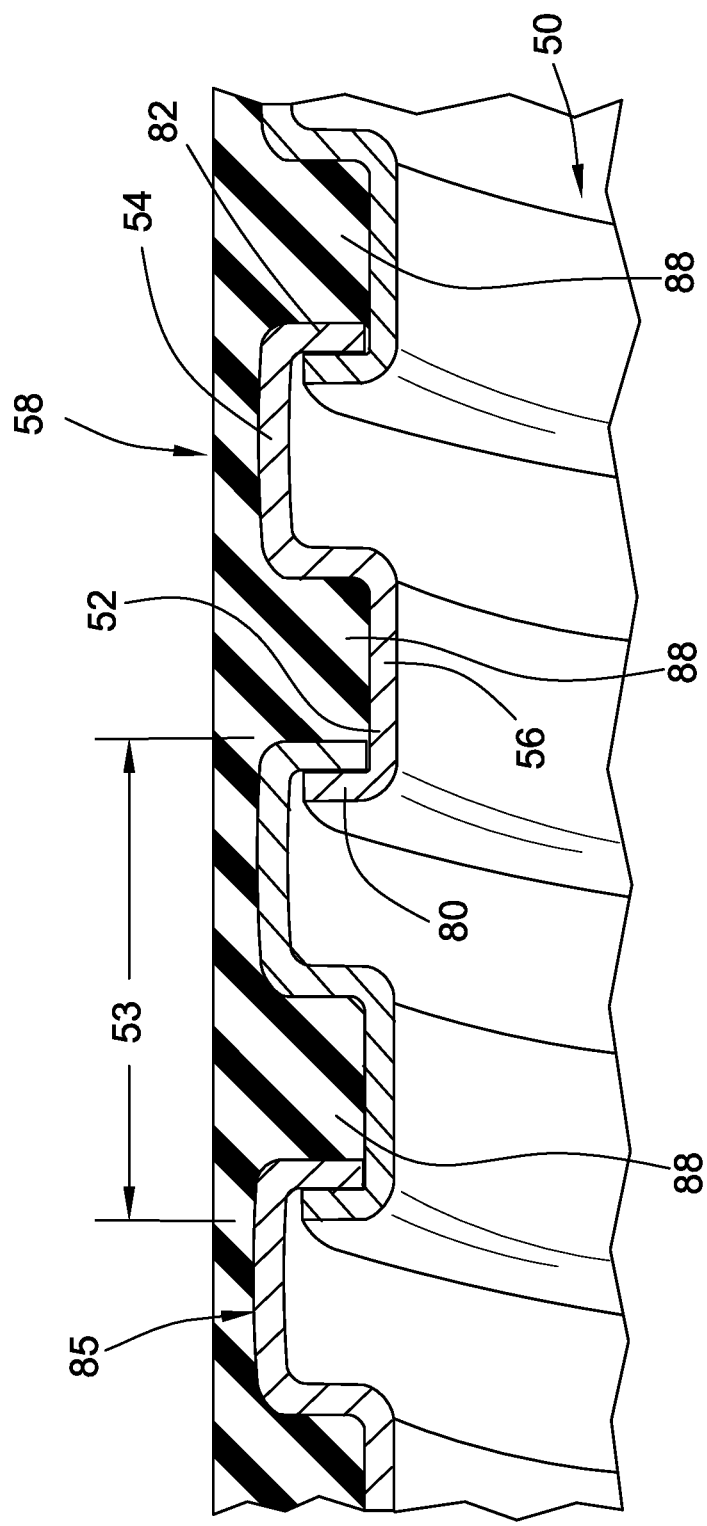
FIG. 4 is a partial, longitudinal cross-sectional view of a metal hose of the arc welder cable of FIG. 2, the metal hose comprising an interlocked monocoil.

The construction of the exemplary hose 52 is shown in FIG. 4, wherein the hose is made from metal and includes a helically arranged band 53, the cross section of which is in the form of an "S" shape. Relative to the outer surface 85, the band 53 includes a convex rib portion 54 and a concave channel portion 56. Each rib portion 54 interlocks with an adjacent channel portion 56. The rib portion 54 and the channel portion 56 cooperate together to interlock the monocoil such that adjacent rib and channel portions 54, 56 limit the amount of axial compression and axial stretch of the hose 52.

In embodiments, the rib portion 54 and the channel portion 56 interlock via an interlocking feature of the hose 52. In the illustrated embodiment, the interlock of the rib and channel portions 54, 56 occurs with overlap of a radially outwardly extending end 80 of the channel portion 56, with a radially inwardly extending end 82 of the rib portion 54. Thus, due to the interlocking features 80, 82, the hose 52 is unable to be stretched more than the interlock configuration permits, and is permitted to compress and/or bend an amount determined by the axial length of the rib and channel interconnection. When the hose 52 has an arcuate shape, one side of the hose can be compressed and the opposite side can be stretched. When urged into an arcuate shape, the interlocking features 80, 82 permit a limited amount of bend, while preventing the hose from bending into an overly-tight arc or radius, which could result in a detrimental kinking of the hose and/or feeding problems for the wire and/or the gas (e.g., a problem known as "bird nesting" where the electrode kinks within the passageway 50 and collects therein in a mass of bent wire, rather than feeding smoothly to the welding torch 14 for delivery upon the workpiece 24).

In embodiments, the interlocking features 80, 82 of the hose 52 are configured to permit a selected amount of axial compression of the hose 52 and is configured to inhibit axial stretch of the hose 52. In embodiments, the interlocking features 80, 82 are configured to limit a bend radius of the arc welder cable 26 along its longitudinal axis.

In embodiments, the hose 52 can provide limited stretching in order to reduce the possibility of breaking other elements of the arc welder cable 26. The hose 52 provides high hoop strength in order to reduce the possibility of crushing to ensure continuous wire feed and gas flow. The hose 52 can provide resistance to bending such that the arc welder cable 26 is limited to a bend radius that does not exceed a selected amount in order to improve the feeding of the electrode and gas therethrough and to help maintain the column strength of the electrode wire.

In other embodiments, the hose 52 can have a different construction. In embodiments, the hose 52 has a construction that exhibits at least some of the characteristics noted above in order to provide long operational life of the arc welder cable 26 and, in particular, avoid kinking or "bird nesting" of the welding wire or a reduction of gas flow through the passageway 50.

Returning to FIGS. 2-4, the hose 52 is provided with an intermediate sheath 58 that surrounds and coats the hose 52. The intermediate sheath 58 is sealingly coated onto and over the hose 52, into the channel portions 56, and any gaps between adjacent bands 53. In embodiments, the intermediate sheath 58 circumscribes the hose 52 such that the hose 52 is disposed radially within the intermediate sheath 58. The intermediate sheath 58 is in sealing contact with the outer surface 85 of the hose 52 to help prevent loss of the shielding gas through the hose 52. The intermediate sheath 58 can be considered a first jacket. The intermediate sheath 58 prevents escape of the gas from the passageway 50, forms a cushion between elements of the hose 52 during lengthwise compression or bending of the hose and forms a cushion for elements of the welding cable 26 that are disposed about the intermediate sheath 58 and the hose 52.

The intermediate sheath 58 is made from an electrically-insulative material. In embodiments, the material forming the intermediate sheath 58 can be any suitable flexible and/or compressible elastomeric material, for example, natural and/or synthetic rubber or plastic materials or compounds. The material forming the intermediate sheath 58 can be gas impermeable and is preferably heat and corrosion resistant. The material of the intermediate sheath 58 can be cured, cross-linked and/or vulcanized by any suitable process to provide more heat resistance and/or corrosion resistance. In embodiments, the intermediate sheath 58 is made from a compressible material. In one embodiment, the material of the intermediate sheath 58 has a Shore A hardness in a range from about sixty to about seventy, and preferably has a Shore hardness of about 65A.

The hose 52 and the intermediate sheath 58, when joined together, can function to limit the amount of bend radius and compression of the welding cable 26. Referring to FIG. 4, the intermediate sheath 58 includes a plurality of radially extending flanges 88. The flanges 88 extend radially inward and are disposed axially within the channel portion 56 of the hose 52. The flanges 88 of the intermediate sheath 58 can help inhibit the relative axial movement of adjacent channel and rib portions 56, 58 and can also help inhibit the bend radius of the arc welder cable 26, while being compressing to permit such relative movement between adjacent channel and rib portions 56, 58.

In the illustrated embodiment, the arc welder cable 26 includes an inner wrap 60. The inner wrap 60 circumscribes the intermediate sheath 58 such that the intermediate sheath 58 is disposed radially within the inner wrap 60. In embodiments, the inner wrap 60 is made from an electrically-insulative material.

In embodiments, the inner wrap 60 can be included to provide a lubricious layer between the conductors 26 and the intermediate sheath 58 to help facilitate the movement of the conductors 62 relative to the intermediate sheath 58 (such as when the arc welder cable 26 is subjected to an axial twisting motion). In embodiments, the intermediate sheath 58 is made from a material having a coefficient of friction, and the inner wrap 60 is made from a lubricious material having a different coefficient of friction. In embodiments, the coefficient of friction of the intermediate sheath 58 is greater than the coefficient of friction of the inner wrap 60.

In embodiments, the inner wrap 60 can be made from any suitable material, such as a suitable lubricious material For example, in embodiments, the inner wrap 60 is made from a lubricious material that comprises at least one of a fluoropolymer and a polyester. For example, in embodiments, the inner wrap 60 is made from at least one of a polytetrafluoroethylene (PTFE) (such as one marketed under the brand name "Teflon" by The Chemours Company of Wilmington, Del., for example) or a polyester film or sheet (such as one marketed under the brand name "Mylar" by DuPont Teijin Films of Chester, Va., for example).

The conductors 62 are disposed circumferentially about the intermediate sheath 58 and are disposed radially outward of the intermediate sheath 58 (and the lubricated wrap 60, when present). The plurality of conductors 62 each extend along the intermediate sheath 58 in a helical manner. The conductors 62 are each made from an electrically-conductive material, such, as copper, for example. The conductors 62 can be configured to carry electrical current through the arc welder cable 26 to the welding torch 14.

In embodiments, the power conductors 62 can be stranded (or solid) copper wires and can be disposed in a helical fashion. The helical arrangement of the power conductors 62 enables the arc welder cable 26 to twist and bend without causing the power conductors to be subjected to undesirable amounts of strain that can lead to early breakage. In embodiments, the helical pitch of the arrangement is a "right-hand" twist, such that a right twisting movement of the welding torch 14 will cause the power conductors 62 to tighten about the intermediate sheath 58. In such a scenario, it would be advantageous for the intermediate sheath 58 to be configured, at least in terms of thickness and material selection, to be compressible and absorb the compressive forces generated by the power conductors 62, while helping to reduce the tendency for power conductor breakage. With respect to a left twisting movement of the welding torch 14, the power conductors 62 can tend to expand and unwind, and, in this case, it would be advantageous for the intermediate sheath 58 to expand slightly to reinforce the position and support of the power conductors about the jacket. A lower helix angle uses more conductor material but can yield better life of the cable 26 because it permits a tighter arc without causing the conductor material to be put into tension. Conversely, a higher helix angle uses less conductor material, but may cause a higher amount of strain and thus conductor breakage when the cable 26 is caused to flex into an arc.

The gauge and number of the power conductors 62 can be provided in a selected range dependent on the amount of current desired to be conducted through the welding system 10 to the welding torch 14 as is well known. The power conductors 62 can be provided in a bunched construction or a rope construction (which can help extend operational life). The wire gauge of the power conductors 62 can be fine or extra fine wire, e.g., about 34-40 gauge.

The arc welder cable 26 can include at least one insulated lead 64 grouped among the power conductors 62. The insulated lead 64 can be disposed circumferentially among the plurality of conductors 62 and disposed radially outward of the intermediate sheath 58 (and the lubricated wrap 60, when present). The insulated lead 64 includes an inner conductor and an insulation sheath. The insulation sheath circumscribes the inner conductor such that the inner conductor is disposed radially within the insulation sheath. The insulation sheath is made from an electrically-insulative material, and the inner conductor is made from an electrically-conductive material.

In embodiments, each of the insulated leads 64 can be in communication with the welding torch 14 and can carry a command signal or a signal that is related to a sensed condition of the welding torch. In other words, the insulated lead 64 has an electrical configuration that can be adapted to support a command and/or monitoring function. The insulated lead 64 can be formed of a plurality of wires, e.g., from two to twelve wires.

The outer wrap 70 circumscribes the plurality of conductors 62 and the pair of insulated leads 64 such that the outer wrap 70 is radially interposed between the outer sheath 72 and the conductors 62 and the insulated leads 64. The outer wrap 70 is made from an electrically-insulative material.

In embodiments, the power conductors 62 and the insulated leads 64 can be overwrapped with an outer wrap 70 that is similar in material and configuration to the inner wrap 60. Both of the lubricated wraps 60, 70 can act as separating members disposed between adjacent elements of the cable 26. Both of the lubricated wraps 60, 70 can reduce voltage transfer between elements of the cable 26 and can be formed of a highly lubricious material to provide a lubricating layer between elements that can exhibit some relative movement therebetween. Both of the lubricated wraps 60, 70 also reinforce the outer sheath 72 that is disposed about the outer wrap 72 and comprises the exterior of the arc welder cable 26.

The outer sheath 72 circumscribes the conductors 62 and the insulated leads 643 such that the outer wrap 70, the conductors 62, the insulated leads 63, the inner wrap 60, the intermediate sheath 58, and the hose 52 are all disposed radially within the outer sheath 72. The outer sheath 72 is made from an electrically-insulative material.

In embodiments, the outer sheath 72 can be made form any suitable material. For example, in embodiments, the outer sheath or jacket 72 can be a single layer or a double layer of an elastomeric material. The material of the outer sheath 72 can be cured, cross-linked and/or vulcanized by any suitable process to provide more heat resistance and/or corrosion resistance. Examples of materials suitable for the jacket 72 are POLY-X® and POLY-XL® insulating jacket material, commercially available from Electron Beam Technologies, Inc. of Kankakee, Ill.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An arc welder cable for supplying a welding current, a welding wire and a supply of shielding gas to a welding torch, the arc welder cable comprising:
   a hose, the hose being resiliently flexible and having an inner surface and an outer surface, the inner surface defining an axial passageway, the axial passageway configured to permit passage of the welding wire and the shielding gas therethrough;
   an intermediate sheath, the intermediate sheath circumscribing the hose such that the hose is disposed radially within the intermediate sheath, the intermediate sheath in sealing contact with the outer surface of the hose, the intermediate sheath being made from an electrically-insulative material;
   a plurality of conductors, the plurality of conductors disposed circumferentially about the intermediate sheath and disposed radially outward of the intermediate sheath, the plurality of conductors each extending along the intermediate sheath in a helical manner, the plurality of conductors each being made from an electrically-conductive material; and
   an outer sheath, the outer sheath circumscribing the plurality of conductors such that the plurality of conductors, the intermediate sheath, and the hose are disposed radially within the outer sheath, and the outer sheath being made from an electrically-insulative material.

2. The arc welder cable of claim 1, wherein the hose comprises an interlocked monocoil.

3. The arc welder cable of claim 2, wherein the hose is made from metal.

4. The arc welder cable of claim 3, wherein the hose is configured to permit no more than a selected amount of bending and a selected amount of stretch of the metal hose.

5. The arc welder cable of claim 3, wherein the interlocked monocoil includes a rib portion and a channel portion, the rib portion and the channel portion cooperating together to interlock the monocoil such that adjacent rib and channel portions limit the amount of axial compression and axial stretch of the hose.

6. The arc welder cable of claim 5, wherein the rib portion and the channel portion interlock via an interlocking feature of the hose.

7. The arc welder cable of claim 6, wherein the interlocking feature includes a radially inwardly extending end of the rib portion and a radially outwardly extending end of the channel portion.

8. The arc welder cable of claim 7, wherein the interlocking feature is configured to permit a selected amount of axial compression of the hose and is configured to inhibit axial stretch of the hose.

9. The arc welder cable of claim 8, wherein the interlocking feature is configured to limit a bend radius of the arc welder cable.

10. The arc welder cable of claim 8, wherein the intermediate sheath is made from a compressible material, the intermediate sheath including a plurality of radially extending flanges, the plurality of radially extending flanges disposed axially within the channel portion.

11. The arc welder cable of claim 1, wherein the intermediate sheath is made from a compressible material.

12. The arc welder cable of claim 11, wherein the compressible material has a Shore A hardness in a range from about 60 to about 70.

13. The arc welder cable of claim 1, further comprising:
   an inner wrap, the inner wrap circumscribing the intermediate sheath such that the intermediate sheath is disposed radially within the inner wrap, the inner wrap being made from an electrically-insulative material.

14. The arc welder cable of claim 13, further comprising:
   an outer wrap, the outer wrap circumscribing the plurality of conductors such that the outer wrap is radially interposed between the outer sheath and the plurality of conductors, the outer wrap being made from an electrically-insulative material.

15. The arc welder cable of claim 13, wherein the intermediate sheath is made from a material having a first coefficient of friction, and the inner wrap is made from a lubricious material having a second coefficient of friction, the first coefficient of friction being greater than the second coefficient of friction.

16. The arc welder cable of claim 15, wherein the lubricious material comprises at least one of a fluoropolymer and a polyester.

17. The arc welder cable of claim 1, further comprising:
   an insulated lead, the insulated lead being disposed circumferentially among the plurality of conductors and disposed radially outward of the intermediate sheath, the insulated lead including an inner conductor and an insulation sheath, the insulation sheath circumscribing the inner conductor such that the inner conductor is disposed radially within the insulation sheath, the insulation sheath being made from an electrically-insulative material, and the inner conductor being made from an electrically-conductive material.

18. The arc welder cable of claim 1, further comprising:
   an outer wrap, the outer wrap circumscribing the plurality of conductors such that the outer wrap is radially interposed between the outer sheath and the plurality of conductors, the outer wrap being made from an electrically-insulative material.

19. An arc welding system, comprising the arc welder cable of claim 1.

20. The arc welding system of claim 19, further comprising:
   a robot assembly, the robot assembly including a welding torch, the arc welder cable being coupled to the welding torch.

* * * * *